(12) United States Patent
Kirovski et al.

(10) Patent No.: US 7,460,683 B2
(45) Date of Patent: *Dec. 2, 2008

(54) ASYMMETRIC SPREAD-SPECTRUM WATERMARKING SYSTEMS AND METHODS OF USE

(75) Inventors: Darko Kirovski, Bellevue, WA (US); Yacov Yacobi, Mercer Island, WA (US)

(73) Assignee: Microsoft Corporation, Redmond, WA (US)

( * ) Notice: Subject to any disclaimer, the term of this patent is extended or adjusted under 35 U.S.C. 154(b) by 382 days.

This patent is subject to a terminal disclaimer.

(21) Appl. No.: 10/990,155

(22) Filed: Nov. 16, 2004

(65) Prior Publication Data

US 2005/0097334 A1    May 5, 2005

Related U.S. Application Data

(63) Continuation of application No. 09/795,275, filed on Feb. 27, 2001, now Pat. No. 6,891,958.

(51) Int. Cl.
*G06K 9/00* (2006.01)
(52) U.S. Cl. .................. 382/100; 713/176; 380/282; 380/285
(58) Field of Classification Search .................. 382/100
See application file for complete search history.

(56) References Cited

U.S. PATENT DOCUMENTS 6,611,599 B2    8/2003    Natarajan
6,754,364 B1 *  6/2004    Yacobi .................. 382/100

OTHER PUBLICATIONS

Furon et al., "Audio public key watermarking technique," Proceedings IEEE Int'l. Conference on Acoustics, Speech and Signal Processing, Jun. 5-9, 2000, pp. 1959-1962, vol. 4.

Wong, "A public key watermark for image verification and authentication," Proceedings Int'l. Conference on Image Processing, Oct. 4-7, 1998, pp. 455-459 vol. 1.

Hartung et al., "Fast public-key watermarking of compressed video," Proceedings International Conference on Image Processing, Oct. 26-29, 1997, pp. 528-531, vol. 1.

* cited by examiner

*Primary Examiner*—Jingge Wu
*Assistant Examiner*—Hadi Akhavannik
(74) *Attorney, Agent, or Firm*—Lee & Hayes, PLLC

(57) ABSTRACT

Described herein is an audio watermarking technology for detecting watermarks in audio signals, such as a music clip. The watermark identifies the content producer, providing a signature that is embedded in the audio signal and cannot be removed. The watermark is designed to survive all typical kinds of processing and all types of malicious attacks that attempt to remove or modify the watermark from the signal. The implementations of the watermark detecting system, described herein, support quick, efficient, and accurate detection of watermarks by the specifically designed watermark detecting system. In one described implementation, a watermark detecting system employs an improved normalized covariance test to determine the presence of a watermark using less expensive materials (hardware), quicker calculations, and a more accurate test (than the original correlation test). In other described implementations, a watermark detecting system employs a cepstrum filter and dynamic processing to minimize the affect of the "noise" in the watermarked signal. The "noise" is the original content of the signal before such signal was watermarked. In still another described implementation, a watermark detecting system employs a mechanism for random detection threshold so that the act of watermark detection does not provide decipherable clues to a digital pirate as to the value or location of the embedded watermark.

35 Claims, 6 Drawing Sheets

ASYMMETRIC SPREAD-SPECTRUM WATERMARKING SYSTEMS AND METHODS OF USE

RELATED APPLICATIONS

This is a continuation of and claims priority to U.S. patent application Ser. No. 09/795,275 filed Feb. 27, 2001, entitled "Asymmetric Spread-Spectrum Watermarking Systems And Methods Of Use" by inventors Darko Kirovski and Yacov Yacobi.

TECHNICAL FIELD

The systems and methods described herein relate to protecting audio, video, digital images and other multimedia content by using watermarks. More particularly, the systems and methods described herein relate to techniques for asymmetric spread-spectrum watermark insertion and detection.

BACKGROUND

Copyright laws exist in virtually every country of the world to protect artists and authors from those who would seek to profit by separating a work from the identity of its creator. The proliferation of the Internet has greatly facilitated the piracy and distribution of audio-visual works. Reproducing a counterfeit work and selling it as an original has never been easier.

At the end of 1997, the International Federation of the Phonographic Industry (IFPI), the British Phonographic Industry, and the Recording Industry Association of America (RIAA) engaged in a project to survey the extent of unauthorized use of music on the Internet. The initial search indicated that at any one time there could be up to 80,000 infringing MP3 files on the Internet. The actual number of servers on the Internet hosting infringing files was estimated to be 2,000 with locations in over 30 countries around the world. Since that survey, the availability of and interest in the digital music on the Internet has increased many times over.

The problem is not limited to audio works. The increasing popularity of streaming video, digital images, and all types of multimedia content has led to increased piracy of these types of works as well. Each day, the wall impeding the reproduction and distribution of infringing content (e.g., audio files, video files, digital images, etc.) gets shorter and weaker.

As a result, pirates effectively rob artists and authors of their lawful compensation. Unless technology provides for those who create artistic works to be compensated, both the creative community and the culture at large will be impoverished.

Identifying a Copyrighted Work

Unlike cassette tapes, CDs or DVDs, a digital content file has no jewel case, label, sticker, or the like on which to place a copyright notice that identifies the author. A digital content file is merely a set of binary data without a detectible and unmodifiable label. Thus, artists and authors are unable to affix a copyright notice to a work so that the public is put on notice that the work is protected by copyright law. Furthermore, such artists and authors are unable to inform the public of any additional information, such as the identity of the copyright holder or terms of a limited license.

Digital Tags

The music industry and trade groups are especially concerned by digital recording because there is no generation loss in digital transfers—a copy sounds the same as the original. Without limits on unauthorized copying, a digital audio recording format could easily encourage the pirating of master-quality recordings.

One solution is to append an associated digital "tag" that identifies the copyright holder to each audio file. To implement such a plan, all devices capable of such digital reproduction must faithfully reproduce the associated tag.

With the passage of the Audio Home Recording Act of 1992, inclusion of serial copying technology became law in the United States. This legislation mandated the inclusion of serial copying technology, such as SCMS (Serial Copy Management System), in consumer digital recorders. SCMS recognizes a "copyright flag" encoded on a prerecorded original (such as a CD), and writes that flag into the subcode of digital copies (such as a transfer from a CD to a DAT tape). The presence of the flag prevents an SCMS-equipped recorder from digitally copying the copy, thus breaking the chain of perfect digital cloning.

However, subsequent developments—both technical and legal—have demonstrated the limited benefits of this legislation. While digital-secure-music-delivery systems (such as SCMS) are designed to support the rights of content owners in the digital domain, the problem of analog copying requires a different approach. In the digital domain, information about the copy status of a given piece of music may be carried in the subcode, which is separate information that travels along with the audio data. In the analog domain, there is no subcode—the only place to put the extra information is to hide it within the audio signal itself.

Digital Watermarks

Techniques for identifying copyright information of digital content that address both analog and digital copying instances have received a great deal of attention in both the industrial community and the academic environment. One of the most promising "digital labeling" techniques is the incorporation of a digital watermark into the audio/video signal itself by altering the signal's frequency spectrum such that the perceptual characteristics of the original recording are preserved. In other words, a watermark is clandestinely integrated with a content sequence so that when copied, the watermark will be reproduced along with the sequence itself.

In general, a "digital watermark" is a pattern of bits inserted into a digital representation (i.e., signal or file) of content (i.e., an image, audio, video, or the like) that identifies the content's copyright information (e.g., author, rights, etc.). The name comes from the faintly visible watermarks imprinted on stationery that identify the manufacturer of the stationery. The purpose of digital watermarks is to provide copyright protection for intellectual property that is in digital format.

Unlike printed watermarks, which are intended to be somewhat visible, digital watermarks are designed to be completely invisible, or in the case of audio clips, inaudible. That is invisible to all except a specifically designed watermark detector. Moreover, the actual bits representing the watermark are typically scattered throughout the file in such a way that they cannot be identified and manipulated. Finally, the digital watermark should be robust enough so that it can withstand normal changes to the file, such as reductions from compression algorithms.

Satisfying all these requirements is no easy feat, but there are several competing technologies. All of them work by making the watermark appear as noise—that is, random data that exists in most digital files anyway. To view a watermark, you need a special program or device (i.e., a "detector") that knows how to extract the watermark data.

Herein, such a digital watermark may be simply called a "watermark." Generically, it may be called an "information pattern of discrete values" or a "data pattern of discrete values." The content sequence (or signal) in which a watermark is encoded is effectively "noise" in relation to the watermark.

Watermarking

Watermarking gives content owners a way to self-identify each content sequence, thus providing proof of ownership and a way to track public performances for purposes of royalty distribution. It may also convey instructions, which can be used by a recording or playback device, to determine whether and how the content may be distributed. Because that data can be read even after the content has been converted from digital to an analog signal, watermarking can be a powerful tool to defeat analog circumvention of copy protection.

The general concept of watermarking has been around for at least 30 years. It was used by companies (such as Muzak™) to audibly identify music delivered through their systems. Today, however, the emphasis in watermarking is on inaudible approaches. By varying signals embedded in analog audio programs, it is possible to create patterns that may be recognized by consumer electronics devices or audio circuitry in computers.

Goals of Watermarking Technology

Watermarking technology has several highly desirable goals to facilitate protection of copyrights of content publishers. Below are listed several of such goals.

Perceptual Invisibility. The embedded information should not induce humanly perceptible changes in the quality of the resulting watermarked signal.

Statistical Invisibility. The embedded information should be quantitatively imperceptive for any exhaustive, heuristic, or probabilistic attempt to detect or remove the watermark. The complexity of successfully launching such attacks should be well beyond the computational power of publicly available computer systems.

Tamper-proofness. An attempt to remove the watermark should damage the value of the content well above the hearing or visual threshold.

Cost Effectiveness. The system should be inexpensive to license and implement on both programmable and application-specific platforms.

Non-disclosure of the Original. The watermarking and detection protocols should be such that the process of proving content copyright both in-situ and in-court, does not involve usage of the original recording.

Enforceability and Flexibility. The watermarking technique should provide strong and undeniable copyright proof. Similarly, it should enable a spectrum of protection levels, which correspond to variable audio/visual presentation and compression standards.

Resilience to Common Attacks. Public availability of powerful digital sound editing tools imposes that the watermarking and detection process is resilient to attacks spawned from such consoles. The standard set of plausible attacks is itemized in the Request for Proposals (RFP) of IFPI (International Federation of the Phonographic Industry) and RIAA (Recording Industry Association of America). The RFP encapsulates the following security requirements:

two successive D/A and A/D conversions,
data reduction coding techniques such as MP3,
adaptive transform coding (ATRAC),
adaptive sub-band coding,
Digital Audio Broadcasting (DAB),
Dolby AC2 and AC3 systems,
applying additive or multiplicative noise,
applying a second Embedded Signal, using the same system, to a single program fragment,
frequency response distortion corresponding to normal analogue frequency response controls such as bass, mid and treble controls, with maximum variation of 15 dB with respect to the original signal, and
applying frequency notches with possible frequency hopping.

Watermark Circumvention

If the encoding of a watermark can thwart a malicious attack, then it can avoid the harm of the introduction of unintentional noise. Therefore, any advancement in watermark technology that makes it more difficult for a malevolent attacker to assail the watermark also makes it more difficult for a watermark to be altered unintentionally.

In general, there are two common classes of malevolent attacks:

1. De-synchronization of watermark in digital signals. These attacks alter signals in such a way to make it difficult for the detector to identify the location of the encoded watermark codes.
2. Removing or altering the watermark. The attacker discovers the location of the watermark and intentionally alters the content sequence to remove or deteriorate a part of the watermark or its entirety.

Framework to Thwart Attacks

Accordingly, there is a need for a framework of protocols for hiding watermarks in digital signals that are effective against malevolent attacks. The framework should also be flexible to enable a spectrum of protection levels, which correspond to variable audio/visual presentation and compression standards, and yet resilient to common attacks spawned by powerful digital sound editing tools.

However, such a framework should support quick, efficient, and accurate detection of watermarks by a specifically designed watermark detector. Moreover, it is desirable for such a framework to minimize false indications of a watermark's presence or absence. Furthermore, it is best if the act of detection does not provide decipherable clues to a digital pirate as to the value or location of the embedded watermark.

Watermark Detection

The watermark detection process is performed by synchronously correlating the suspected content sequence with the watermark of the content publisher. A common pitfall for all watermarking systems that facilitate this type of data hiding is intolerance to desynchronization attacks (e.g., sample cropping, insertion, repetition, variable pitch-scale and time-scale modifications, audio restoration, and arbitrary combinations of these attacks) and deficiency of adequate techniques to address this problem during the detection process.

Furthermore, it is desirable to have a highly accurate, quick, and efficient watermark detection system. When detecting a watermark, the content of the sequence (e.g., video) is merely noise in relation to the watermark. Therefore, this "noise" hinders with such accurate, quick, and efficient watermark detection. However, of course, the watermark's purpose is to protect this "noise."

Moreover, the mere act of accurately detecting a watermark in a signal may aid a digital pirate in empirically ascertaining the watermark. Conventionally, this risk is considered small and too difficult to address; therefore, the industry lives with this risk.

Traditional (Symmetric) Watermarking

FIG. 1 is a diagram showing a traditional watermarking technique utilized in a transaction between a copyright owner 100 and a client 102 over the Internet 104. A watermark generator 106 provides a digital watermark 108 that is incorporated into a content sequence 110 in a watermarking module 111 to form a watermarked content sequence 112. The watermarked content sequence 112 is uploaded to the Internet 104 and, ultimately, is downloaded to a computer 114 of the client 102. The computer 114 stores an application 116 that is used to determine if a content sequence contains the watermark 108. To do this, a watermark detector 118 in the application 116 has access to a copy of the watermark 108' stored on the computer 114. The watermark detector 118 applies a correlation test with the watermarked content sequence 112 and the watermark 118' to determine if the watermarked content sequence 112 contains the watermark 118'.

The watermark 108' must be stored on the computer 114 in such a way that it remains secret, for if a malevolent attacker has a copy of a watermark, the attacker can simply subtract the watermark from a watermarked content sequence and have an unmarked content sequence. However, it is impossible to store the watermark 108' on the computer 114 in such a way that it cannot be discovered. Furthermore, there is a problem of keeping the watermark 108 secret when transmitting the watermark 108 from the copyright owner 100 to the computer 114 at the client 102.

For this reason, traditional watermarking schemes have failed to provide a reliable way to incorporate a watermark within a content sequence and detect the watermark in the content sequence without providing an attacker with the key to extracting the watermark.

SUMMARY

Described herein is a public key, or asymmetric, technique for incorporating a watermark into a content sequence, such as a video signal or an audio signal. Also described is a corresponding technique to detect a watermark in a content sequence. The incorporation of the watermark utilizes a private, or private key, watermark, while the detection of the watermark utilizes a public, or public key, watermark that is derived from the private key watermark. The private key watermark is, therefore, not required to detect the watermark that is incorporated into the content sequence. Therefore, anyone possessing the means to detect the watermark does not have access to the watermark itself.

The watermark identifies the content producer, providing a signature that is embedded in the audio signal and cannot be removed. The watermark is designed to survive all typical kinds of processing and all types of malicious attacks that attempt to remove or modify the watermark from the signal. The implementations of the watermark detecting system, described herein, support quick, efficient, and accurate detection of watermarks by the specifically designed watermark detecting system.

A copyright owner takes a private key watermark that is either provided a priori or that is generated by the copyright owner, and creates a public key watermark by incorporating the private key watermark into a watermark carrier signal. The watermarked content sequence is provided to a client. The client has access to the public key watermark, which is either made publicly available or is provided with the content sequence. In one implementation, the public key watermark is also hidden, but is retrievable by one having lawful access to the underlying protected work.

A content sequence can be tested to determine if it contains the private key watermark by performing a correlation test on the content sequence with the public key watermark. The results of the correlation test indicate whether the private key watermark is contained in the content sequence or not.

The systems and methods described herein can be utilized with virtually any existing watermarking scheme. Those skilled in the art will appreciate that one advantage of the asymmetric watermarking technique described herein is that it is relatively simple to add the technique as an additional layer to an existing scheme.

This summary itself is not intended to limit the scope of this patent. Moreover, the title of this patent is not intended to limit the scope of this patent. For a better understanding of the present invention, please see the following detailed description and appending claims, taken in conjunction with the accompanying drawings. The scope of the present invention is pointed out in the appending claims.

BRIEF DESCRIPTION OF THE DRAWINGS

The same numbers are used throughout the drawings to reference like elements and features.

DETAILED DESCRIPTION

The following description sets forth specific embodiments of the improved audio watermark detector that incorporate elements recited in the appended claims. These embodiments are described with specificity in order to meet statutory written description, enablement, and best-mode requirements. However, the description itself is not intended to limit the scope of this patent. Rather, the inventors have contemplated that the claimed improved audio watermark detector might also be embodied in other ways, in conjunction with other present or future technologies.

Introduction

Described herein are exemplary implementations of an asymmetric, or public key, watermarking technique (i.e., "exemplary watermarking technique").

Figure 1:
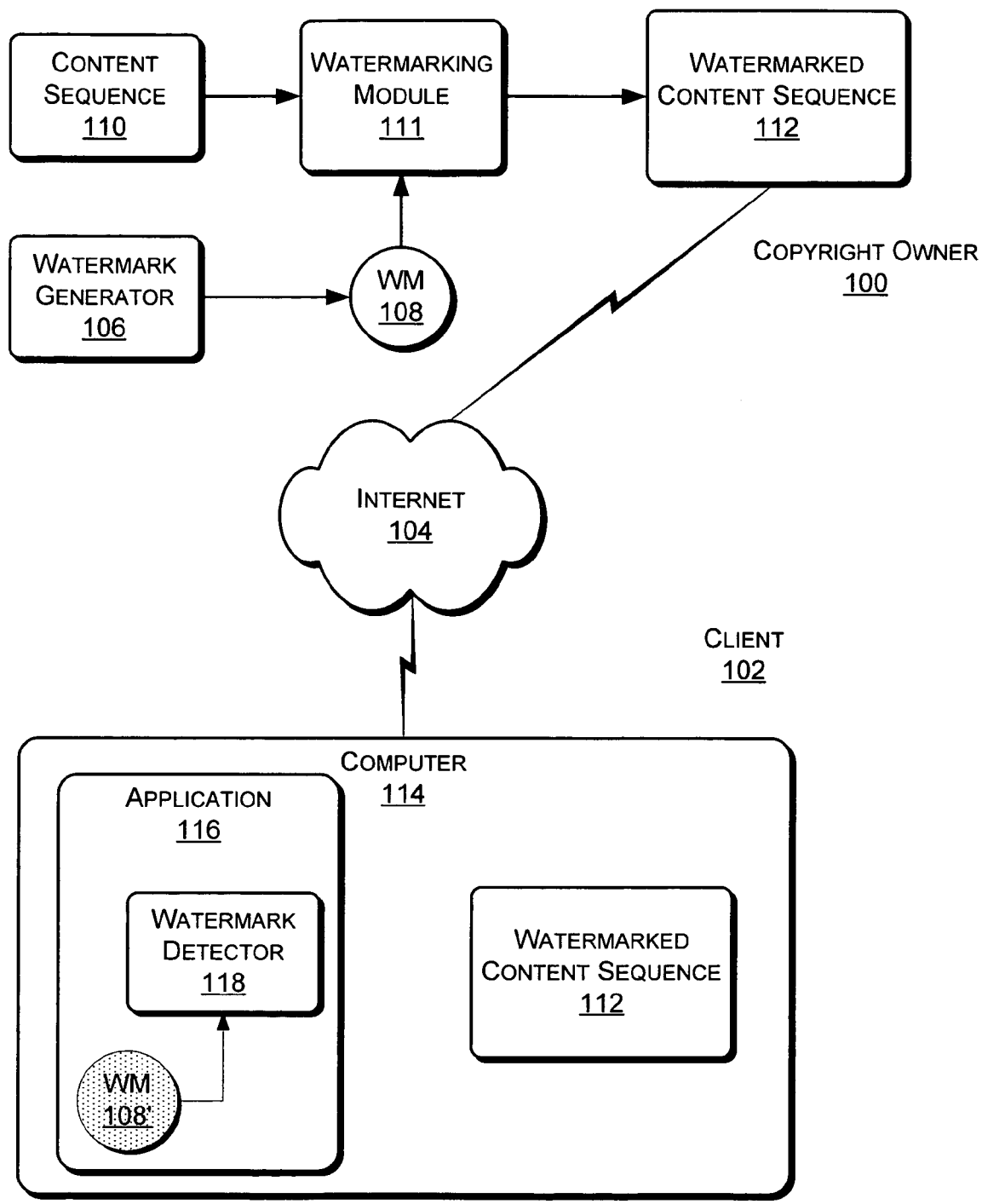
FIG. 1 is a diagram of a prior art technique for incorporating a watermark into a content sequence and distributing the content sequence to a client over a network.
Figure 2:
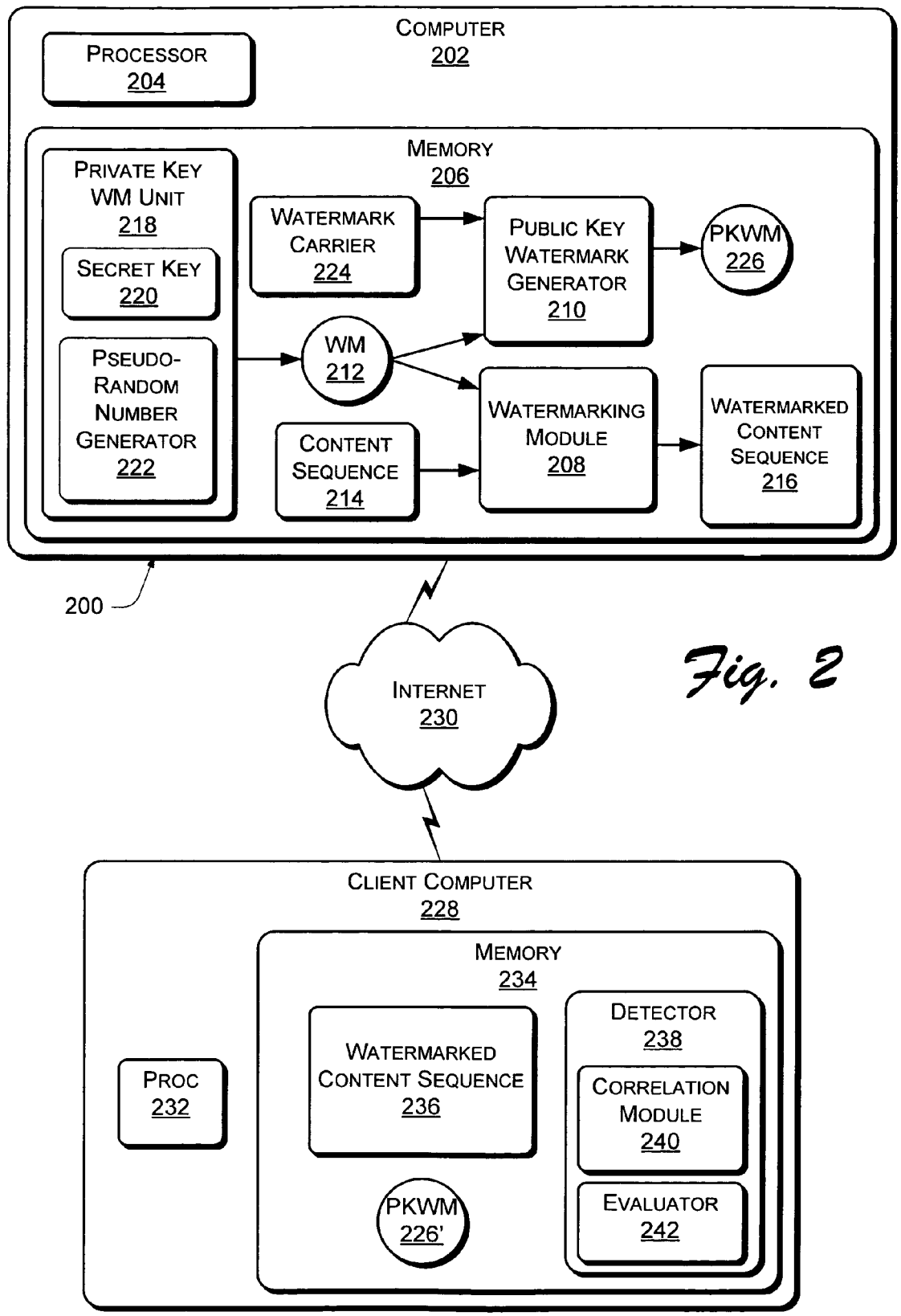
FIG. 2 is a diagram of an asymmetric watermarking technique for incorporating a private key watermark into a content sequence and distributing the content sequence and a public key watermark to a client over a network.
Figure 5:
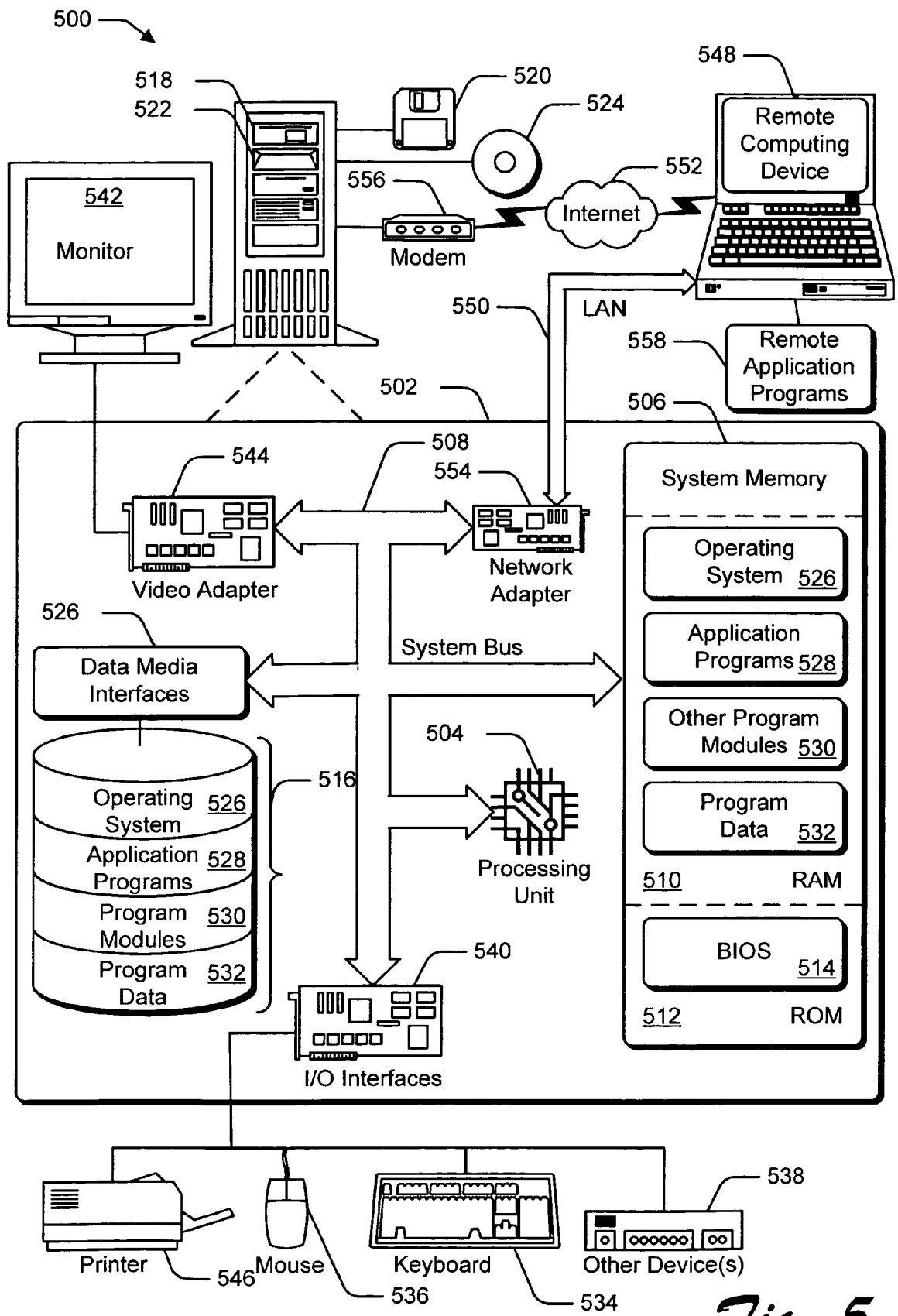
FIG. 5 is an example of a computing operating environment capable of implementing the public key watermarking system.

The exemplary watermarking technique described herein may be implemented by a production and distribution system like that shown in FIG. 2 and by a computing environment like that shown in FIG. 5.

A watermark may be generically called an "information pattern of multiple discrete values" and/or a "data pattern of multiple discrete values" because it is a pattern of binary bits designed to convey information and/or data. It may also be referred to simply as a "data pattern." A watermark is encoded in a digital content sequence (or signal, video, clip, file, etc.). In relation to the watermark, the content sequence is effectively "noise." In general, watermarking involves hiding the information of the watermark within the "noise" of a digital signal.

A public key (asymmetric) watermarking technique requires several situations to hold true in order for the technique to be valid. A copyright owner must secure all private keys (private watermarks) and all original works so that no other party has access to them. This is somewhat easier to accomplish than the requirement of a traditional public key watermarking scheme in which the private key had to be kept secret even though it was stored on a client computer. This requirement imposes no great burden because there are many instances in which data are kept private and methods of doing so exist in abundance.

The copyright owner or a trusted party watermarks an original work (content sequence) by adding the private key (spread-spectrum sequence) to it. Watermarked copies of the work are publicly distributed along with a public key that is made by adding the private key to a watermark carrier signal. A client application must be configured to detect whether the watermarked content has been watermarked using the private key that corresponds to the public key.

Production and Distribution System Using Asymmetric Watermarking

FIG. 2 shows a public key watermarking system 200 implemented in a computer 202. The public key watermarking system 200 may be implemented as a standalone process or it may be incorporated into other applications or an operating system. The computer 202 has a processor 204 and memory 206.

The memory 206 stores a watermarking module 208 and a public key watermark generator 210. The watermarking module 208 is configured to receive a private key watermark signal 212 and incorporate it into a content sequence 214 to produce a watermarked content sequence 216. The content sequence 214 may be a video, audio, digital image or multimedia signal.

The private key watermark signal 212 is an array of bits provided by a cryptographically secure private key watermark unit 218. The private key watermark unit 218 generates the private key watermark signal 212 from a secret key 220 and a pseudo-random number generator 222. The pseudo-uniqueness of each private key watermark signal 212 is provided by initiating the random number generator with a key unique to each copyright owner. Typically, the private key watermark signal 212 identifies the copyright owner, providing a signature that is embedded in a content sequence and that cannot be removed. The private key watermark signal 212 is designed to survive all typical kinds of processing, including compression, equalization, D/A and A/D conversion, recording on analog tape, and so forth. It is also designed to survive malicious attacks that attempt to remove the watermark from the signal, including changes in time and frequency scales, pitch shifting, and cut/paste editing.

The private key watermark signal 212 is embedded into the content sequence 214 by altering its frequency magnitudes such that the perceptual characteristics of the original content sequence are preserved. Each magnitude in the frequency spectrum is altered according to the appropriate bit in the watermark.

In an alternative implementation, the private key watermark signal 212 is simply stored in the memory 206 and provided by the private key watermark unit 218. Any method known in the art for generating the private key watermark signal 212 may be used.

The public key watermark generator 210 accepts the private key watermark signal 212 and incorporates it into a watermark carrier signal 224 to form a public key watermark signal 226. The public key watermark generator 210 may generate the watermark carrier signal 224 or the watermark carrier signal 224 may be provided to the public key watermark generator 210. Selecting an appropriate watermark carrier signal 224 will be discussed in greater detail below.

The watermarked content sequence 216 and the public key watermark signal 226 are distributed to a client computer 228 over the Internet 230 (or via any other network or distribution channel known in the art). The watermarked content sequence 216 and the public key watermark signal 226 may be distributed together or separately, depending on the distribution scheme and the purposes for which protection of the content sequence is sought. If, for example, the watermarked content sequence 216 is an audio clip, it may be desirable to download the public key watermark 226 with the audio clip so that one purchasing the audio clip can verify the authenticity of the audio clip.

In one implementation, the public key watermark may also be hidden. This provides an additional security step in that one having the lawful right to the underlying protected work will also be provided with the means to extract the public key before using the public key as described herein.

The client computer 228 includes a processor 232 and memory 234. The public key watermark signal 226' is shown stored in the memory 234 after it has been received from the copyright owner. A watermarked content sequence 236 is also stored in the memory 234. For purposes of discussion, assume that it is not known at this time whether the watermarked content sequence 236 stored in the memory 234 of the client computer 228 contains the private key watermark signal 212 of the copyright owner.

The memory 234 also stores a watermark detector 238, which includes a correlation module 240 and an evaluator 242. The correlation module 240 is configured to compute a normalized correlation test with the watermarked content sequence 236 and the public key watermark signal 226'. The evaluator 242 is configured to evaluate the result of the normalized correlation test from the correlation module 240 and determine whether the private key watermark signal 212 that corresponds to the public key watermark signal 226' is incorporated into a content sequence. The function of the watermark detector 238 and its components will be discussed in greater detail below.

Watermark Incorporation

Figure 3:
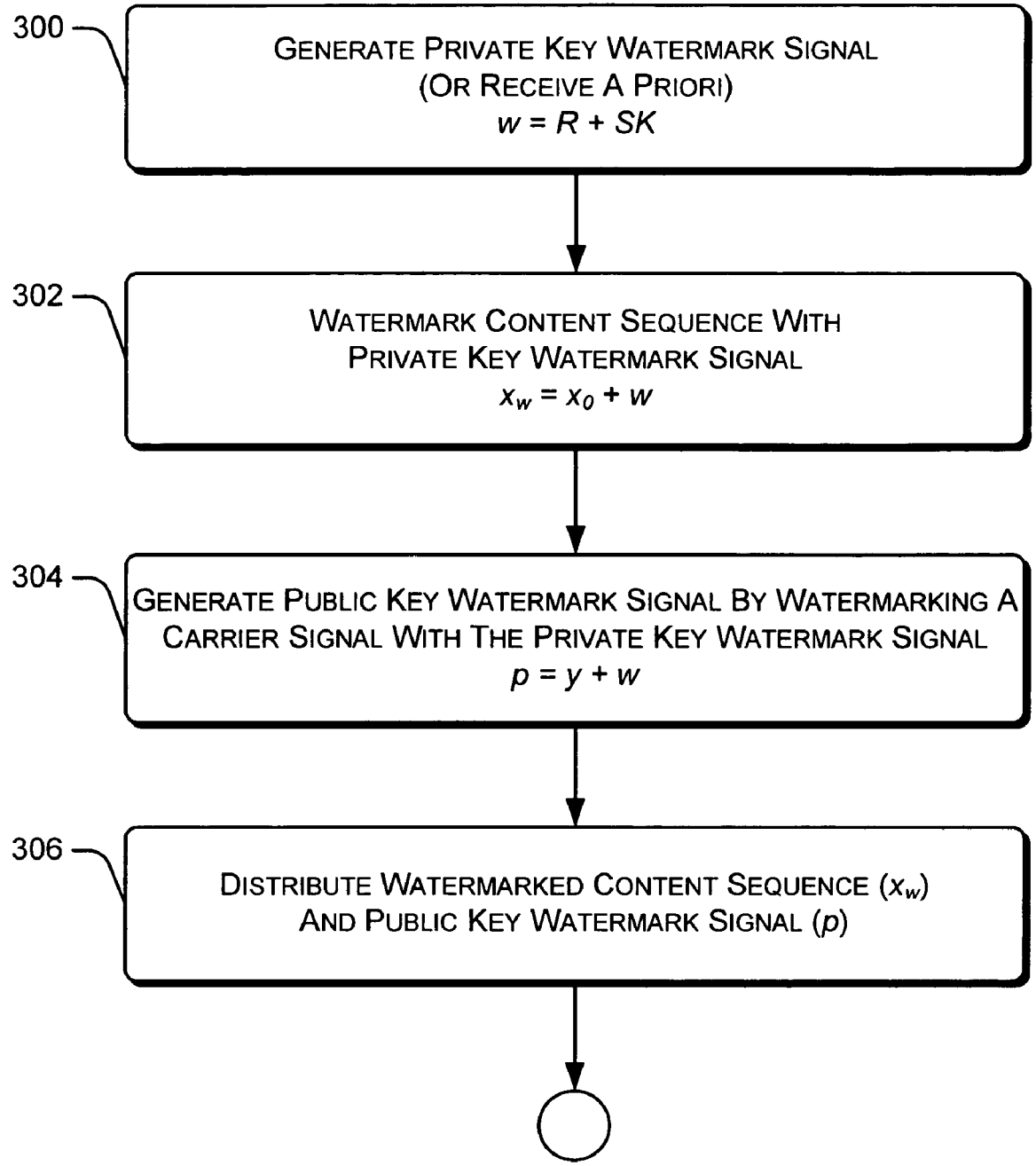
FIG. 3 is a flow diagram showing a methodological implementation of an asymmetric (public key) watermarking technique for incorporating a private watermark into a content sequence and producing a public key watermark that corresponds to the private key watermark.

FIG. 3 is a flow diagram showing a methodological implementation of an asymmetric (public key) watermarking technique for incorporating a private watermark into a content sequence and producing a public key watermark that corresponds to the private key watermark. In the discussion of FIG. 3, continuing reference will be made to the features and reference numerals of FIG. 2.

At step 300, the private key watermarking unit 218 generates the private key watermark signal (w) 212 from the secret key (SK) 220 and the pseudo-random number generator (R) 222. The exact method by which this is done is well known in the art. The private key watermarking unit 218 may also be configured to merely store a previously generated private key watermark, in which case a random number generator is not required.

At step 302, the private key watermark signal 212 is embedded into the content sequence 214 by linear point-to-point addition:

$$x_w = x_0 \oplus w, \; w \in \{-A, +A\}$$

where $x_w$ is the watermarked content sequence 216, $x_0$ is the content sequence 214, w is the private key watermark signal 212, and A is the amplitude of the private key watermark signal (w) 212.

The public key watermark signal 226 is created by linear point-to-point addition of the private key watermark signal 212 and the watermark carrier 224 (step 304):

$$p = w \oplus y$$

where p is the public key watermark signal 226, w is the private key watermark signal 212 and y is the watermark carrier 224. The watermark carrier 224 is a pseudo-random zero-mean $\sigma^2$ variance signal vector with a pseudo-random probability distribution function pdf(y). The watermark carrier (y) 224 is mutually independent with respect to the private key watermark signal (w) 212.

At step 306, the watermarked content sequence ($x_w$) 216 and the public key watermark signal (p) 226 are distributed publicly. As previously discussed, the watermarked content sequence 216 and the public key watermark signal 226 may be distributed together or separately, depending on the circumstances.

It can be assumed, with no loss of generality, that signals $x_0$, $x_w$, y and p are zero-mean variables with Gaussian distribution $\Gamma(0,\sigma)$, where $\sigma^2$ is the variance of the signal.

Watermark Detection

Figure 4A:
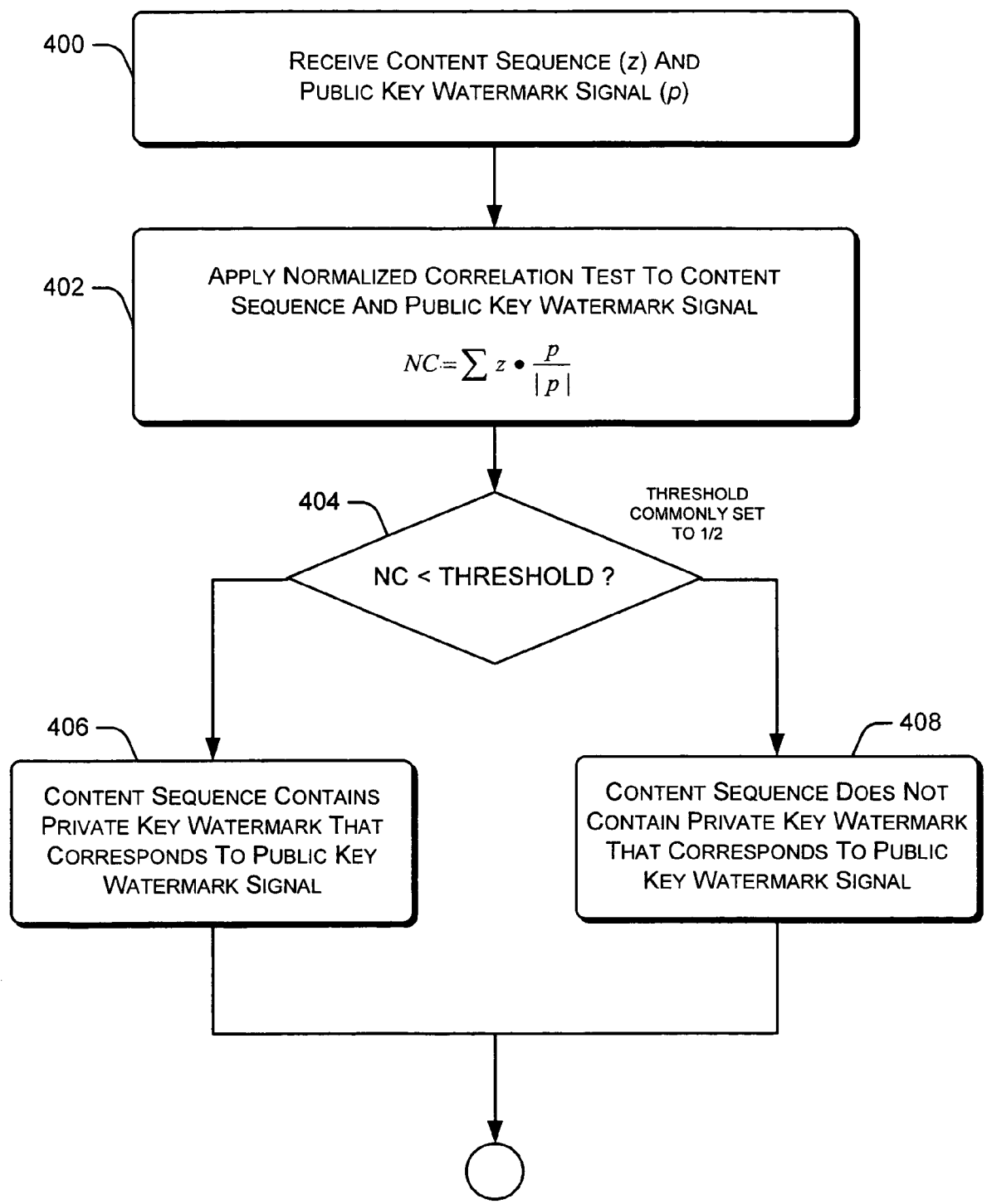
FIG. 4A is a flow diagram showing a methodological implementation of a technique for using a public key watermark to detect whether a content sequence contains a private key watermark that corresponds to the public key watermark.

FIG. 4A is a flow diagram showing a methodological implementation of a technique for using a public key watermark to detect whether a content sequence contains a private key watermark that corresponds to the public key watermark. For the discussion of FIG. 4A, continuing reference will be made to the features and reference numerals of FIG. 2.

At step 400, the client computer 228 receives the watermarked content sequence (z) 236 and the public key watermark signal (p) 226' that corresponds to the private key watermark signal 212. It is noted that, for this discussion, the watermarked content sequence 236 may be any content sequence, watermarked or otherwise. Since the following discussion deals with determining if a given content sequence contains a watermark or not, it is assumed that it is not known initially if the watermarked content sequence 236 is watermarked or not. If the watermarked content sequence 236 does contain a watermark, it is assumed that it is not known if the watermark in the watermarked content sequence 236 is the private key watermark signal 212 or some other watermark.

At step 402, a normalized correlation test is applied to the watermarked content sequence 236 and the public key watermark signal 226' to determine if the watermarked content sequence 236 contains the private key watermark signal 212. The test to detect whether the private key watermark signal 212 is embedded into an input signal vector (z) is:

$$C(z, p) = z \cdot p = \sum_{i=1}^{|w|} z_i \cdot p_i$$

If the input signal vector (z) is a sum of the private key watermark signal (w) 212 and an independent signal vector $x_0$ (the content sequence 214), the correlation test can be rewritten as follows:

$$C(z,p) = x_0 \cdot w + y \cdot w + x_0 \cdot y + w = x_0 \cdot w + y \cdot w + x_0 \cdot y + A^2 \cdot |w|,$$

where |w| is the cardinality of the private key watermark signal 212.

Although the watermark carrier (y) 224 is entitled to an arbitrary zero-mean $\sigma^2_y$-variance distribution pdf(y), according to the Central Limit Theorem and the fact that |y|>>1, in the above equation, y can be modeled as a zero-mean Gaussian variable $\Gamma(0,\sigma_y)$. Thus, the resulting correlation C(z,p) can be rewritten as follows:

$$C(z, p) = x_0 \cdot w + y \cdot w + x_0 \cdot y + A^2 \cdot |w| =$$

$$A^2 \cdot |w| + \sum_{i=1}^{|w|} (x_i \cdot w_i + y_i \cdot w_i + x_i \cdot y_i) =$$

$$A^2 \cdot |w| + \sum_{i=1}^{|w|} [A \cdot \Gamma(0, \sigma_x) + A \cdot \Gamma(0, \sigma_y) + \Gamma(0, \sigma_x) \cdot \Gamma(0, \sigma_y)] =$$

$$A^2 \cdot |w| + A \cdot \sum_{i=1}^{|w|} \left[ \Gamma(0, \sigma_x) \cdot \sqrt{1 + \frac{\sigma_y^2}{\sigma_x^2} + \frac{\sigma_y^2}{A^2}} \right] =$$

$$A^2 \cdot |w| + A \cdot \Gamma\left[0, \sigma_x \sqrt{|w|} \sqrt{1 + \frac{\sigma_y^2}{\sigma_x^2} + \frac{\sigma_y^2}{A^2}}\right]$$

If the input signal vector (z) contains the private key watermark signal (w) 212 that corresponds to the public key watermark signal (p) 226', then $$z = x_0 \oplus w$$

The normalized version of the correlation test is described by the following formula:

$$Q(z, p(w)) = \frac{C(z, p(w))}{|w|A^2}$$

Therefore, the normalized correlation test of z and p yields:

$$Q(z,p(w)) = 1 + \Gamma(0,\sigma_n)$$

whereas, if the input signal vector (z) does not contain the private key watermark signal (w) 212 that corresponds to the public key watermark signal (p) 226', then the normalized correlation test of z and p yields:

$$Q(z,p(w)) = 0 + \Gamma(0,\sigma_m).$$

where $x_0$, y, and w are mutually independent and $$\sigma_n = \frac{\sigma_x}{A \cdot \sqrt{|w|}} \cdot \sqrt{1 + \frac{\sigma_y^2}{\sigma_x^2} + \frac{\sigma_y^2}{A^2}}$$

and $$\sigma_m = \frac{\sigma_x}{A \cdot \sqrt{|w|}} \cdot \sqrt{1 + \frac{\sigma_y^2}{A^2}} < \sigma_n.$$

Thus, if the watermarked content sequence 236 is not watermarked with the private key watermark signal (w) 212, the normalized correlation test will equal zero. If the watermarked content sequence 236 contains the private key watermark signal (w) 212, the normalized correlation test will result in $A^2$.

It is noted that there is a correlation test and a normalized version of the correlation test. When normalization is performed, then the value of the correlation test is divided with the cardinality of the spread spectrum sequence and the square of its amplitude (A). In the case of a correlation test, the result converges to $A^2|w|$ if the watermark is present, or to zero if the watermark is not present. In the normalized version of the correlation test, the result converges to one if the watermark is present, or to zero if the watermark is not present.

In the case of a normalized correlation, the test result is typically in the range of $(0-\epsilon)$ to $(1+\epsilon)$, where $\epsilon$ is dependent on the variance. To determine whether a sequence is watermarked or not, Q is compared with a threshold, T. The value of T is between zero (no watermark) and one (watermark present). A commonly adopted value for the evaluation of the correlation test result is, therefore, one-half (½).

At step 404, the evaluator 242 receives the results of the normalized correlation test from the correlation module 240. If the result is greater than a threshold value (commonly a value of one-half (½)), then the watermarked content sequence 236 is watermarked with the private key watermark signal 212 (step 406). If the result of the normalized correlation is less than the threshold value, then the watermarked content sequence 236 is not watermarked with the private key watermark signal 212 (step 408).

Trade-Offs in Designing the Watermark Carrier Signal

The design of a viable public key watermarking technique imposes few challenges mostly related to the design of the watermark carrier signal. Namely, watermark carrier $y=\Gamma(0, \sigma_y=0)$ renders both $N_{PK}=N_{WM}$ and $p=w$, thus canceling the public property of the public-key watermark. With the increase of $\sigma_y$, the private-key watermark becomes more "embedded" into the watermark carrier and thus the scheme gains on security. Unfortunately, increasing $\sigma_y$ is not a trade-off free process. The larger the standard deviation $\sigma_y$, the longer the public-key watermark. Since the complexity of the detection algorithm is directly proportional to watermark length, the goal imposed on the watermark carrier design is to minimize resulting watermark length for maximum public-key watermark security. In this subsection, a quantitative measure of a public-key watermark security is discussed.

Assume that the watermark carrier y is generated using a zero-mean random-number generator of an arbitrary zero-mean probability distribution function $\Psi_{\tilde{y}}(t)$, where t is the domain of y. For a truly random zero-mean private watermark $\tilde{w}$, $\tilde{w} \in \{-\Delta, +\Delta\}$, the following equality holds:

$$\Psi_{\tilde{p}}(t) = p(w=-\Delta) \cdot \Psi_{\tilde{y}}(t+\Delta) + p(w=+\Delta) \cdot \Psi_{\tilde{y}}(t-\Delta) =$$
$$= \frac{1}{2}[\Psi_{\tilde{y}}(t+\Delta) + \Psi_{\tilde{y}}(t-\Delta)]$$

The Public-Key Watermark Inversion Attack (PKWI).

Assume that the malicious attacker knows the distribution $\Psi_{\tilde{y}}(t)$ of the watermark carrier. Then, for each t the attacker computes $\lambda(t)=\Psi_{\tilde{y}}(t+\Delta)-\Psi^{\tilde{y}}(t-\Delta)$. Then, the attacker performs the following action: if $\lambda(t)=0$ the attacker does not do anything, else the attacker adds $\Delta \cdot \sin(\lambda(t))$ to each $z_i \in \tilde{z}$ for which corresponding $p_i=t$, $p_i \in \tilde{p}$.

Attack End.

The PKWI attack aims to "filter-out" certain part of the private-key watermark w from the watermarked document z as a consequence of the inconsistency between $\Psi_{\tilde{p}}(t)$ and $\Psi_{\tilde{p}}(t)$. Portion H of w, that the attacker is expected to remove from z, equals:

$$H = \min\left\{1, \frac{1}{2}\int_{-\infty}^{+\infty} |\Psi_{\tilde{y}}(t-\Delta) - \Psi_{\tilde{y}}(t+\Delta)| \cdot dt\right\}$$

Figure 4B:
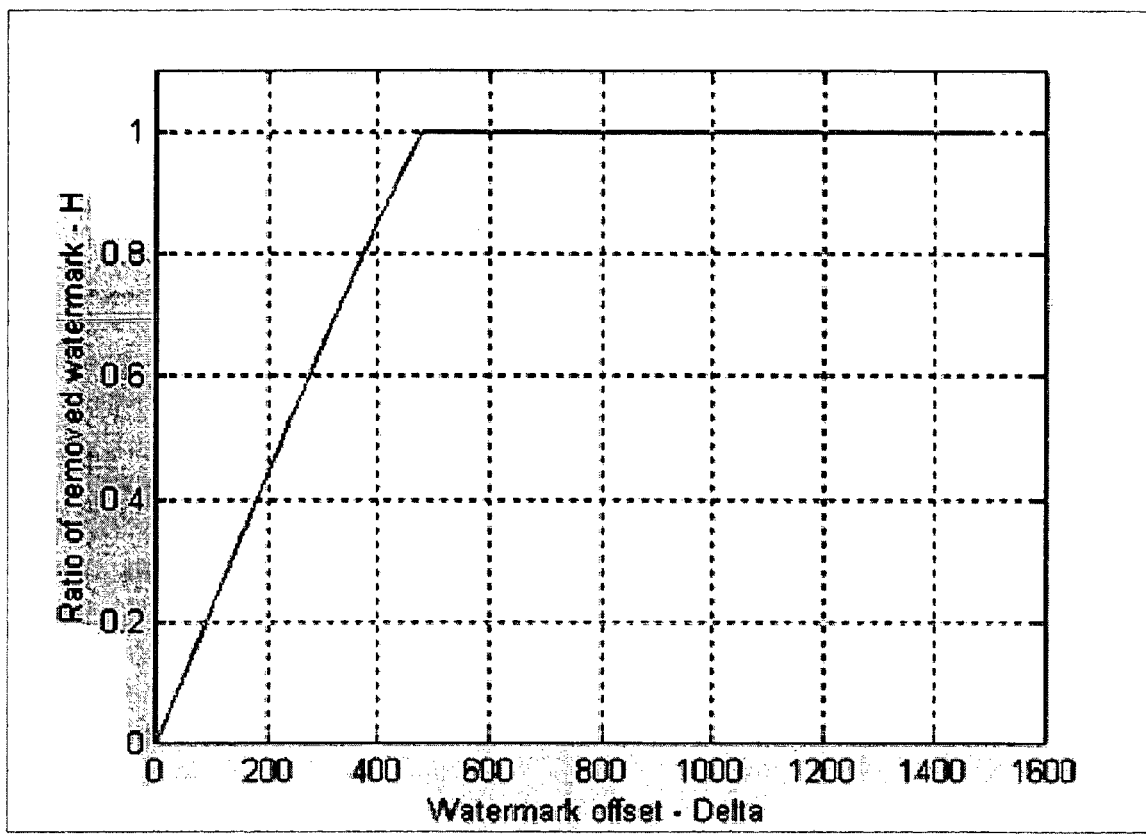
FIG. 4B is a graph showing the increase of H with the increase of $\Delta/\sigma_y$.

For example, if the watermark carrier y has a uniform distribution $y_i \in \{-Y,+Y\}, Y_i \in y$ with standard deviation $\sigma_y=Y/\sqrt{3}$, portion H of w, that the attacker is expected to remove from z, equals $H=\min(1, \Delta/(2 \cdot Y))$. In another example, if the watermark carrier is generated using a pseudo-random number generator that obeys the Gaussian probability distribution, the PKWI attack removes $H=\min(2 \cdot \text{erf}(\Delta/\sigma_y), 1)$ of the private-key watermark from z. FIG. 4B shows the rapid increase of H with the increase of $\Delta/\sigma_y$ (actually in the Graphic scaled as $1000 \cdot \Delta/\sigma_y$). Thus, the watermark carrier fully reveals the private-key watermark for $\sigma_y<\Delta/2$. The question posed is: which watermark carrier distribution $\Psi_{\tilde{y}}(t)$ results in minimal H under the assumption that $t \in \{-T,+T\}$ is a limited domain?

As it turns out, uniform $\Psi_{\tilde{y}}(t)=U(t)=1/(2T)$, $t \in \{-T,+T\}$ watermark carrier generation results in minimum $H_0$ under the assumption that the domain t of y is finite $t \in \{-T,+T\}$.

Consider a piece $d\delta=dt \times d\Psi_{\tilde{y}}(t)$ of probability located at $t=T_1$. This piece can be relocated anywhere on the t-axis except of course at $t=T_1$ to create a new $\Psi_1(t)|H_1$. There are two possible effects of this relocation on $H_1$: if it is relocated at $t=T_1\pm2\Delta$, $H_1$ increases for $d\delta/2$, and if $d\delta$ is relocated anywhere else $H_1$ remains the same as $H_0$. Since any probability distribution function $\Psi_{\tilde{y}}(t)$ can be created using a succession of probability relocations from regions where $U(t)>\Psi_{\tilde{y}}(t)$ onto regions where $U(t)<\Psi_{\tilde{y}}(t)$, and at each infinitesimal step $H_i \leq H_{i+1}$, thus resulting in $H_0|U(t) \leq H_N|\Psi_{\tilde{y}}(t)$.

As a conclusion, the watermark carrier y is optimally generated using a pseudo-random number generator with uniform zero-mean probability distribution $\Psi_{\tilde{y}}(t)=U(t)=1/(2 \cdot Y)$, $t \in \{-Y,+Y\}$ and variance $\sigma_y^2=Y^2/3$, expecting that PKWI attack would remove $H=\min(1, \Delta/(2 \cdot Y))$ of the private watermark in the watermarked document.

It is also important to stress that y can be generated using a zero-mean $\Psi_{\tilde{y}}(t)$ that is unknown to the attacker (i.e., it represents part of the private key). However, the design of such a scheme should be carefully performed because of: (i) the danger of possible mutual correlation with certain original documents and more importantly, (ii) the danger of extracting the secret $\Psi_{\tilde{y}}(t)$ by averaging a large number of different public-key watermarks. For example, in the audio domain, an exemplary $y|\Psi_{\tilde{y}}(t)$ may be a secret, scaled, normalized, and cepstrum-filtered audio clip. Although it is hard for the attacker to realize the underlying $\Psi_{\tilde{y}}(t)$, it may happen that rare original audio clips are actually correlated with $\Psi_{\tilde{y}}(t)$ (for example rhythm, instrument selection, etc.).

Note that, in general, all documents watermarked with the same public key are each other's public-key watermarks. Thus, it is important to stress that the same PKWI attack can be similarly launched against traditional spread-spectrum watermarking schemes. Because of this, regardless of the type of watermarking scheme (PKWM or WM), it is important that the watermarked documents are tested against dangerous conditions introduced in this subsection that indicate ease of revealing/removing the embedded watermark. In addition, if the watermarked domain can be modeled accurately with any formally given $\Psi_{\tilde{y}}(t)$, the PKWI attack can be exceptionally attractive.

The Subtraction Attack

In the previous subsection, we have created a lower bound on the variance of the watermark carrier due to the PKWI attack. However, there exists yet another exceptionally plausible attack that can be devastating to a PKWM scheme (for example, Girod's PKWM scheme can be successfully attacked using this technique).

With no loss of generality, it can be assumed that for high quality watermarking, the embedded information is considered a low noise. As such, it can be assumed that from the perspective of preserving fidelity of the document, two watermarks can be added to a document without devaluating the document copy. For example, note that most common editing attacks are much more severe than watermark augmentation.

The Subtraction Attack (SUBA).

Assume that a public-key watermark is created using y, $\Psi$ $\tilde{y}(0,\sigma_y)$, where $\sigma_y$ is small enough such that by subtracting $p=y+w$ from an already watermarked signal $z=x_o+w$, the resulting document $z_1=z-p$ preserves fidelity (an example of such a watermark is Girod's PKWM scheme). The normalized correlation tests of the watermarked documents yield $NC(z, p)=n_o=1\pm\epsilon$ and $NC(z_1, p)=n_1=-1\pm\epsilon$, $\epsilon<<1$. Document $z_2$ of satisfactory fidelity which yields $NC(z_2, p)=n_{2=0}$ is created by probabilistically multiplexing documents z and $z_1$ with respective probabilities $|n_1|/(|n_0|+|n_1|)$ and $|n_0|/(|n_0|+|n_1|)$.

Attack End.

The only solution against the SUBA attack is prevention. If the standard deviation $\sigma_y$ of the watermark carrier y is large enough, then the created document $z_2$ with an undetectable watermark is rendered unusable. For example, typical values for $\sigma_y$ in an audio PKWM scheme that encodes the watermark in the frequency domain have a lower range of $\sigma_y \in \{1.5,2\}$ dB. Again, note that the SUBA attack can be launched on a traditional watermarking scheme in the case when the original document $x_o$ has low $\sigma_x$ and thus can be used as a "public-key watermark". Such audio clips must be watermarked with a unique watermark.

Other Considerations

Although, conceptually, public key and traditional spread-spectrum watermarking are equivalent, performance-wise, public key watermarking trails traditional watermarking due to increased variance of it correlation integral. Performance-wise equivalence between the two schemes can be established for longer public key watermarking spread-spectrum sequences. According to the Central Limit Theorem and equivalence of Chernoff probabilities, the normalized correlations of traditional spread-spectrum watermarking and public key (asymmetric) spread-spectrum watermarking have the same variance, if the cardinality of the public key watermarking sequence ($N_{PK}$) is related to the cardinality of a traditional watermarking sequence ($N_T$) as follows:

$$N_{PK} = N_T \cdot \left[\sigma_y^2 + A \cdot \left(\frac{\sigma_x^2}{\sigma_y^2}+1\right)\right].$$

The design of a viable public key watermarking technique imposes a few challenges, as discussed above. Empirical studies have shown that a zero-mean Gaussian distribution with $\sigma_x > \sigma_y > A$ represents a well-designed carrier. For example, a carrier such as $$\sigma_y \in \{2.5A, 5A\}$$

has shown to work very well in the public key watermarking scheme.

Exemplary Computing System and Environment

FIG. 5 illustrates an example of a suitable computing environment 500 within which an exemplary watermarking system as described herein, may be implemented (either fully or partially). The computing environment 500 may be utilized in the computer and network architectures described herein.

The exemplary computing environment 500 is only one example of a computing environment and is not intended to suggest any limitation as to the scope of use or functionality of the computer and network architectures. Neither should the computing environment 500 be interpreted as having any dependency or requirement relating to any one or combination of components illustrated in the exemplary computing environment 500.

The exemplary watermark detector may be implemented with numerous other general purpose or special purpose computing system environments or configurations. Examples of well known computing systems, environments, and/or configurations that may be suitable for use include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The asymmetric watermarking system may be described in the general context of computer-executable instructions, such as program modules, being executed by a computer. Generally, program modules include routines, programs, objects, components, data structures, etc. that perform particular tasks or implement particular abstract data types. The asymmetric watermarking system may also be practiced in distributed computing environments where tasks are performed by remote processing devices that are linked through a communications network. In a distributed computing environment, program modules may be located in both local and remote computer storage media including memory storage devices.

The computing environment 500 includes a general-purpose computing device in the form of a computer 502. The components of computer 502 can include, by are not limited to, one or more processors or processing units 504, a system memory 506, and a system bus 508 that couples various system components including the processor 504 to the system memory 506.

The system bus 508 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 502 typically includes a variety of computer readable media. Such media can be any available media that is accessible by computer 502 and includes both volatile and non-volatile media, removable and non-removable media.

The system memory 506 includes computer readable media in the form of volatile memory, such as random access memory (RAM) 510, and/or non-volatile memory, such as read only memory (ROM) 512. A basic input/output system (BIOS) 514, containing the basic routines that help to transfer information between elements within computer 502, such as during start-up, is stored in ROM 512. RAM 510 typically contains data and/or program modules that are immediately accessible to and/or presently operated on by the processing unit 504.

Computer 502 may also include other removable/non-removable, volatile/non-volatile computer storage media. By way of example, FIG. 5 illustrates a hard disk drive 516 for reading from and writing to a non-removable, non-volatile magnetic media (not shown), a magnetic disk drive 518 for reading from and writing to a removable, non-volatile magnetic disk 520 (e.g., a "floppy disk"), and an optical disk drive 522 for reading from and/or writing to a removable, non-volatile optical disk 524 such as a CD-ROM, DVD-ROM, or other optical media. The hard disk drive 516, magnetic disk drive 518, and optical disk drive 522 are each connected to the system bus 508 by one or more data media interfaces 526. Alternatively, the hard disk drive 516, magnetic disk drive 518, and optical disk drive 522 can be connected to the system bus 508 by one or more interfaces (not shown).

The disk drives and their associated computer-readable media provide non-volatile storage of computer readable instructions, data structures, program modules, and other data for computer 502. Although the example illustrates a hard disk 516, a removable magnetic disk 520, and a removable optical disk 524, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 516, magnetic disk 520, optical disk 524, ROM 512, and/or RAM 510, including by way of example, an operating system 526, one or more application programs 528, other program modules 530, and program data 532. Each of such operating system 526, one or more application programs 528, other program modules 530, and program data 532 (or some combination thereof) may include an embodiment of pattern generator; a correlation module; a watermark pre-processor; a random operator; and a watermark detector.

A user can enter commands and information into computer 502 via input devices such as a keyboard 534 and a pointing device 536 (e.g., a "mouse"). Other input devices 538 (not shown specifically) may include a microphone, joystick, game pad, satellite dish, serial port, scanner, and/or the like. These and other input devices are connected to the processing unit 504 via input/output interfaces 540 that are coupled to the system bus 508, but may be connected by other interface and bus structures, such as a parallel port, game port, or a universal serial bus (USB).

A monitor 542 or other type of display device can also be connected to the system bus 508 via an interface, such as a video adapter 544. In addition to the monitor 542, other output peripheral devices can include components such as speakers (not shown) and a printer 546 which can be connected to computer 502 via the input/output interfaces 540.

Computer 502 can operate in a networked environment using logical connections to one or more remote computers, such as a remote computing device 548. By way of example, the remote computing device 548 can be a personal computer, portable computer, a server, a router, a network computer, a peer device or other common network node, and the like. The remote computing device 548 is illustrated as a portable computer that can include many or all of the elements and features described herein relative to computer 502.

Logical connections between computer 502 and the remote computer 548 are depicted as a local area network (LAN) 550 and a general wide area network (WAN) 552. Such networking environments are commonplace in offices, enterprise-wide computer networks, intranets, and the Internet.

When implemented in a LAN networking environment, the computer 502 is connected to a local network 550 via a network interface or adapter 554. When implemented in a WAN networking environment, the computer 502 typically includes a modem 556 or other means for establishing communications over the wide network 552. The modem 556, which can be internal or external to computer 502, can be connected to the system bus 508 via the input/output interfaces 540 or other appropriate mechanisms. It is to be appreciated that the illustrated network connections are exemplary and that other means of establishing communication link(s) between the computers 502 and 548 can be employed.

In a networked environment, such as that illustrated with computing environment 500, program modules depicted relative to the computer 502, or options thereof, may be stored in a remote memory storage device. By way of example, remote application programs 558 reside on a memory device of remote computer 548. For purposes of illustration, application programs and other executable program components such as the operating system are illustrated herein as discrete blocks, although it is recognized that such programs and components reside at various times in different storage components of the computing device 502, and are executed by the data processor(s) of the computer.

Computer-Executable Instructions

An implementation of an asymmetric watermarking system may be described in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Exemplary Operating Environment

FIG. 5 illustrates an example of a suitable operating environment 500 in which an exemplary asymmetric watermarking system may be implemented. Specifically, the exemplary asymmetric watermarking system(s) described herein may be implemented (wholly or in part) by any program modules 528-530 and/or operating system 528 in FIG. 5 or a portion thereof.

The operating environment is only an example of a suitable operating environment and is not intended to suggest any limitation as to the scope or use of functionality of the exemplary public key watermarking system(s) described herein. Other well known computing systems, environments, and/or configurations that are suitable for use include, but are not limited to, personal computers (PCs), server computers, hand-held or laptop devices, multiprocessor systems, microprocessor-based systems, programmable consumer electronics, wireless phones and equipments, general- and special-purpose appliances, application-specific integrated circuits (ASICs), network PCs, minicomputers, mainframe computers, distributed computing environments that include any of the above systems or devices, and the like.

Computer Readable Media

An implementation of an exemplary public key watermarking system may be stored on or transmitted across some form of computer readable media. Computer readable media can be any available media that can be accessed by a computer. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media.

The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

CONCLUSION

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A method, comprising:
   summing a private key watermark signal with a watermark carrier signal to create a public key watermark signal;
   combining the private key watermark signal with a content sequence to create a watermarked content sequence; and
   wherein it can be determined if an input content sequence contains the private key watermark signal by correlating the input content sequence with the public key watermark signal.

2. The method as recited in claim 1, further comprising generating the private key watermark signal.

3. The method as recited in claim 1, wherein the watermark carrier signal further comprises a uniformly distributed signal having a variance that is greater than a variance of the private key watermark signal.

4. The method as recited in claim 1, wherein:
   the private key watermark signal has an amplitude; and
   the watermark carrier signal further comprises a signal exhibiting a zero-mean Gaussian distribution having a standard deviation that is greater than the amplitude of the private key watermark signal.

5. The method as recited in claim 4, wherein the standard deviation of the watermark carrier signal is larger than the standard deviation of the private watermark signal such that a significant portion of the private key watermark signal cannot be determined from analyzing the public key watermark signal.

6. The method as recited in claim 5, wherein the standard deviation of the watermark carrier signal is from two and one-half times to five times the amplitude of the private key watermark signal.

7. The method as recited in claim 1, wherein the combining a private key watermark signal with a watermark carrier signal further comprises performing a linear point-to-point addition of the private key watermark signal and the watermark carrier signal.

8. The method as recited in claim 1, wherein the combining the private key watermark signal with a content sequence further comprises performing a linear point-to-point addition of the private key watermark signal and the content sequence.

9. The method as recited in claim 1, wherein the content sequence is an audio signal.

10. The method as recited in claim 1, wherein the content sequence is a video signal.

11. The method as recited in claim 1, wherein the content sequence is a digital image.

12. The method as recited in claim 1, wherein the content sequence is multimedia data.

13. The method as recited in claim 1, wherein the carrier signal is a pseudo-randomly generated signal.

14. A system for incorporating a private key watermark signal into a content sequence, comprising:
   a processor;
   memory;
   a private key watermark unit;
   a public key watermark signal generation unit configured to generate a public key watermark by summing the private key watermark signal with a watermark carrier signal;
   a watermarking unit configured to incorporate the private key watermark signal into a content sequence; and
   wherein it can be determined if the content sequence contains the private key watermark signal by correlating the content sequence with the public key watermark signal.

15. The system as recited in claim 14, wherein the private key watermark unit is configured to store the private key watermark, which is accepted a priori.

16. The system as recited in claim 14, wherein the private key watermark unit is configured to generate the private key watermark.

17. The system as recited in claim 14, wherein the private key watermark unit is configured to generate the private key watermark from a secret key and a pseudo-random number generator.

18. The system as recited in claim 14, wherein:
   the private key watermark signal has an amplitude; and
   the watermark carrier signal further comprises a signal that exhibits a zero-mean Gaussian distribution having a standard deviation that is greater than the amplitude of the private key watermark signal.

19. The system as recited in claim 14, wherein the standard deviation of the watermark carrier signal is from two and one-half times to five times the amplitude of the private key watermark signal.

20. The system as recited in claim 14, wherein the content sequence further comprises a signal that exhibits a zero-mean Gaussian distribution having a standard deviation that is greater than the standard deviation of the watermark carrier signal.

21. The system as recited in claim 14, wherein the public key watermark signal generation unit is further configured to generate a public key watermark by linear point-to-point addition of the private key watermark signal and the watermark carrier signal.

22. The system as recited in claim 14, wherein the content sequence is an audio signal.

23. The system as recited in claim 14, wherein the content sequence is a video signal.

24. The system as recited in claim 14, wherein the content sequence is a digital image.

25. One or more computer storage readable media containing computer-executable instructions that, when executed on a computer, perform the following steps: creating a public key watermark signal by summing a private key watermark signal with a watermark carrier signal; watermarking a content sequence by incorporating the private key watermark signal into a the content sequence; and wherein the private key watermark signal can be detected in the content sequence by correlating the public key watermark signal with the content sequence.

26. The one or more computer storage readable media as recited in claim 25, further comprising computer-executable instructions that, when executed on a computer, generate the private key watermark signal.

27. The one or more computer storage readable media as recited in claim 25, wherein: the private key watermark signal has an amplitude; and the watermark carrier signal further comprises a signal having a zero-mean Gaussian distribution with a standard deviation that is greater than the amplitude of the private key watermark signal.

28. The one or more computer storage readable media as recited in claim 25, wherein the standard deviation of the watermark carrier signal is from two and one-half times to five time the amplitude of the private key watermark signal.

29. The one or more computer storage readable media as recited in claim 25, wherein the content sequence further comprises a signal that exhibits a zero-mean Gaussian distribution having a standard deviation that is greater than the standard deviation of the watermark carrier signal.

30. The one or more computer storage readable media as recited in claim 25, wherein the creating the public key watermark signal further comprises performing linear point-to-point addition with the private key watermark signal and the watermark carrier signal to create the public key watermark signal.

31. The one or more computer storage readable media as recited in claim 25, wherein the watermarking further comprises creating a watermarked content sequence by linear point-to-point addition of the private key watermark signal and the content sequence.

32. The one or more computer storage readable media as recited in claim 25, wherein the content sequence is an audio signal.

33. The one or more computer storage readable media as recited in claim 25, wherein the content sequence is a video signal.

34. The one or more computer storage readable media as recited in claim 25, wherein the content sequence is a digital image.

35. The one or more computer storage readable media as recited in claim 25, wherein the content sequence is multimedia data.

* * * * *